UNITED STATES PATENT OFFICE.

CHARLES E. HORE, OF NEW YORK, N. Y., ASSIGNOR, BY MESNE ASSIGN-
MENTS, TO FRED L. LAVANBURG, OF SAME PLACE.

INSECTICIDE AND PROCESS OF MAKING SAME.

SPECIFICATION forming part of Letters Patent No. 617,020, dated January 3, 1899.

Application filed March 31, 1896. Serial No. 585,637. (Specimens.)

*To all whom it may concern:*

Be it known that I, CHARLES E. HORE, a citizen of the United States, residing at New York, (Brooklyn,) Kings county, New York, have invented a new and useful Composition of Matter, which I call herein an "Insecticide," and a Process of Making the Same, of which the following is a full, clear, and exact specification.

I am aware that a combination of arsenic, soda, blue vitriol, and acetic acid has been used before for this purpose; but in that process the sulfuric acid in the sulfate of copper unites with the soda in the carbonate of soda and is washed out, leaving a coarse crystalline product; also, the quantity of sulfate of copper combining with the soda in that process is restricted to as much as the carbonate of soda will neutralize and also any uncombined aresenic passes away in the waste mother-liquor, a considerable loss of poisonous matter. This product, known as "paris-green," is very deficient in body. As will be hereinafter seen, my process produces a composition of very much greater bulk.

My invention has for its object the production of an insecticide from the combination of arsenious acid, lime, sulfate of copper, and acetic acid which shall be cheap, effective, and easy of manufacture.

To carry my invention into effect, I take one hundred and thirty-three pounds of good clean caustic lime and slake with warm water and pass through a sieve and put the same into a shallow wooden vat or tub. To this I add about enough hot water to make up four hundred gallons of bulk or measurement. Then I put into this with a shovel or scoop four hundred and forty pounds white arsenic or arsenious acid and boil and stir the whole mass for from one-half to one hour. It is not necessary to boil it; but for the purpose of expediting the process I prefer to boil it. In a separate vessel I dissolve six hundred and fifty pounds of blue vitriol in two hundred gallons of hot water and throw into the vat on top of the arsenic and lime. After stirring these together for half an hour I cool the mixture down to about 135° or 130° Fahrenheit—not over 140° Fahrenheit in any case—resulting in an arsenite of calcium. At this point I introduce all of the acetic acid, amounting to three hundred and sixty pounds, and of the quality known to the trade as "No. 8 Commercial" or thirty per cent. acid. The whole mass is now stirred for ten minutes and should be about 130° to 135° Fahrenheit in temperature. It is left to stand for one hour, when a stir is given of five to ten minutes' duration to get everything up from the bottom. At the expiration of the first hour another stir of five to ten minutes is given and it is left to stand for another hour. At the expiration of the second hour another stir of five to ten minutes is given and it is left to stand until the expiration of the third hour, when the last stir is given and the brew is finished and the product drained on linen filters and dried in the usual manner. I prefer to dry it on frames of wood, although it may be dried on a copper bed.

In the above process the stirs may be given more frequently, especially after the first hour of rest; but I prefer to carry out the plan described; also, the arsenic and lime together may be poured upon the blue-vitriol solution without affecting the result; also, the acetic acid and blue-vitriol solution may be blended together and poured on the arsenic and lime together, and the results will be the same; but if the temperature of the arsenic and lime and blue vitriol be too great when put together the combination described herein will not be effected, nor will the color be the same.

The first step in my process—namely, the mixture of the arsenic or arsenious acid with the water and lime—results in the formation of arsenite of lime or calcium. The addition thereto of the excess of sulfate of copper or blue vitriol results in the formation of sulfate and arsenite of lime and hydrated oxid of copper, in combination with arsenite of copper. The final addition of the acetic acid forms a double salt of acetate and arsenite of copper and arsenite and sulfate of calcium.

In my process the arsenite of lime employed does not neutralize the solution of blue vitriol or sulfate of copper when brought together, but leaves a large percentage of uncombined blue vitriol in the mother-lye, which subsequently, through the presence of the acetic acid employed, unites with the arsenite of lime used, combining or taking up all of the blue vitriol to the extent of ten to thirteen per cent. more than is possible with the soda process; also, the arsenic is held in combination with the lime and copper to such a degree that there is less waste in the wash-waters, and, finally, the principal portion of the lime enters into combination with the resulting product, and the result is a light flocculent pulverulent precipitate of a pale apple-green color. The product prepared by this process is distinct from those resulting from the employment of arsenic, soda, and acetic acid in that it has lime in combination with the result.

The product of my process contains a very much greater amount of poisonous matter than that produced by other processes and is therefore more valuable as an insecticide. The product is more bulky than that of other processes and is therefore more economical of manufacture. The greater bulk is due to the fact that the lime is retained in the combination, while in the soda process nearly all the soda is washed out.

I am also aware of the process referred to in *Spons' Workshop Receipts*, 1873, on page 95, for making "Vienna" or "Schweinfurt green;" but this is very different from my process. In said Vienna-green process the acetic acid is initially mixed with the blue vitriol and lime, forming crude acetate of copper and free sulfate of lime. Arsenic is then specified to be dissolved in boiling water and added to the solution of acetate of copper and free sulfate of lime; but as it takes one hundred parts of boiling water to dissolve eleven parts of arsenic and only a comparatively small quantity of water can be used the result is that only a minor portion of the arsenic is dissolved in the water and over fifty per cent. of the arsenic does not combine with the acetate of copper, but remains as free arsenic mixed with the arsenite of copper in the product—Vienna green—which is therefore not homogeneous in composition. Further, as the free arsenic is by no means as effective as an insecticide as the chemically-combined arsenic the product is of varying and uncertain quality. In my process, on the contrary, by initially mixing the arsenic with the lime, then adding the sulfate of copper, and finally the acetic acid all the arsenic is caused to enter into fixed chemical combination with the other elements, and there is no free arsenic whatsoever in the final product, which is a double salt of perfectly definite homogeneous composition of acetate and arsenite of copper and arsenite and sulfate of calcium. This salt is, as stated, different from that produced by the Vienna-green process, being far more poisonous as an insecticide, of a soft flocculent character, and of a uniform bluish-green color, the Vienna green being of a hard uneven character and of a varying yellowish-green color.

What I claim, and desire to secure by Letters Patent, is—

1. The process of producing a composition of matter for use as an insecticide, which consists in adding arsenious acid to a mixture of water and lime; in stirring the resulting product, forming arsenite of calcium; in adding thereto an excess of sulfate of copper, and thereby forming sulfate and arsenite of lime, and hydrated oxid of copper in combination with arsenite of copper; and finally adding thereto acetic acid forming the final product, which is a double salt of acetate and arsenite of copper and arsenite and sulfate of calcium; all substantially in the manner and proportions specified.

2. The composition of matter for use as an insecticide, produced as described, and consisting of a double homogeneous salt of acetate of copper and arsenite of copper and arsenite and sulfate of calcium, devoid of free arsenic, and of a soft, flocculent, pulverulent, character and bluish-green color.

In testimony whereof I have hereunto set my hand and seal, this 16th day of March, 1896, in the presence of two witnesses.

CHARLES E. HORE. [L. S.]

Witnesses:
HENRY MARTYN ALEXANDER, Jr.,
J. WARREN BIRD.